Sept. 24, 1963 A. J. TORREY 3,104,893
SUPPORTING STAND FOR SNOW PLOWS OR THE LIKE VEHICLE ATTACHMENTS
Original Filed Jan. 15, 1959 5 Sheets-Sheet 1

INVENTOR.
ANTHONY J. TORREY
BY
ATTORNEY

Sept. 24, 1963 A. J. TORREY 3,104,893
SUPPORTING STAND FOR SNOW PLOWS OR THE LIKE VEHICLE ATTACHMENTS
Original Filed Jan. 15, 1959 5 Sheets-Sheet 2

FIG. 2

INVENTOR.
ANTHONY J. TORREY
BY
*Abbott Spear*
ATTORNEY

Sept. 24, 1963  A. J. TORREY  3,104,893
SUPPORTING STAND FOR SNOW PLOWS OR THE LIKE VEHICLE ATTACHMENTS
Original Filed Jan. 15, 1959  5 Sheets-Sheet 3

INVENTOR.
ANTHONY J. TORREY
BY
ATTORNEY

Sept. 24, 1963 A. J. TORREY 3,104,893
SUPPORTING STAND FOR SNOW PLOWS OR THE LIKE VEHICLE ATTACHMENTS
Original Filed Jan. 15, 1959 5 Sheets-Sheet 4
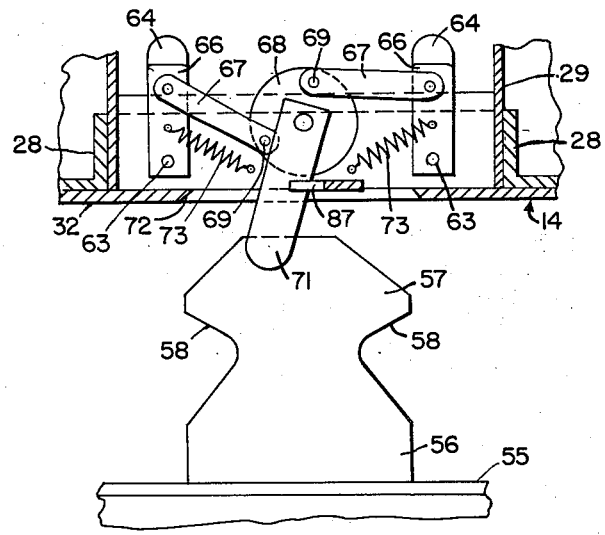
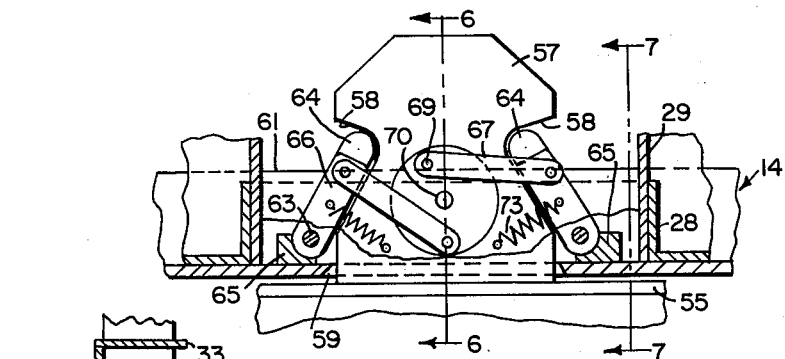
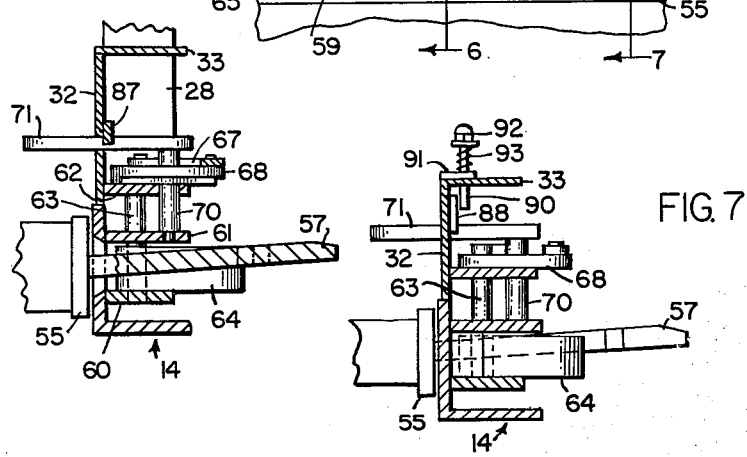
INVENTOR.
ANTHONY J. TORREY
BY
ATTORNEY Sept. 24, 1963  A. J. TORREY  3,104,893
SUPPORTING STAND FOR SNOW PLOWS OR THE LIKE VEHICLE ATTACHMENTS
Original Filed Jan. 15, 1959  5 Sheets-Sheet 5

INVENTOR.
ANTHONY J. TORREY
BY
ATTORNEY

United States Patent Office 3,104,893
Patented Sept. 24, 1963

---

3,104,893
SUPPORTING STAND FOR SNOW PLOWS OR THE LIKE VEHICLE ATTACHMENTS
Anthony J. Torrey, 274 Edgell Road, Framingham, Mass.
Original application Jan. 15, 1959, Ser. No. 787,080, now Patent No. 3,020,066, dated Feb. 6, 1962. Divided and this application Nov. 16, 1961, Ser. No. 152,902
5 Claims. (Cl. 280—475)

The present invention relates to supporting stands for snow plows or like attachments, each stand being operable to maintain the attachment in a position to receive the attaching element carried by the vehicle and the present application is a division of my co-pending application, Serial Number 787,080, filed January 15, 1959, now Patent No. 3,020,066, granted February 6, 1962.

In attaching snow plows or scrapers to trucks or other vehicles, speed convenience, and postiveness of the coupling are important considerations and the principal objective of this invention is to provide a stand that will hold such an attachment in a position enabling the operato to drive his vehicle against it to bring coactive, interlocking parts of the vehicel and the attachment into engagement and that will then automatically move into an inoperative position.

This general objective is attained, in accordance with the invention, by connecting a stand to the frame of the attachment for movement between raised inoperative and lowered operative positions. The stand is yieldably held in its inoperative position and is located adjacent the end of the frame that is to be engaged by the thrust member of the vehicle when the attachment is coupled thereto. The stand is provided with a latch operable to hold it in a supporting position but the latch has a release disposed to be actuated when engaged by the thrust member on the coupling of the attachment to the vehicle.

Figure 3:
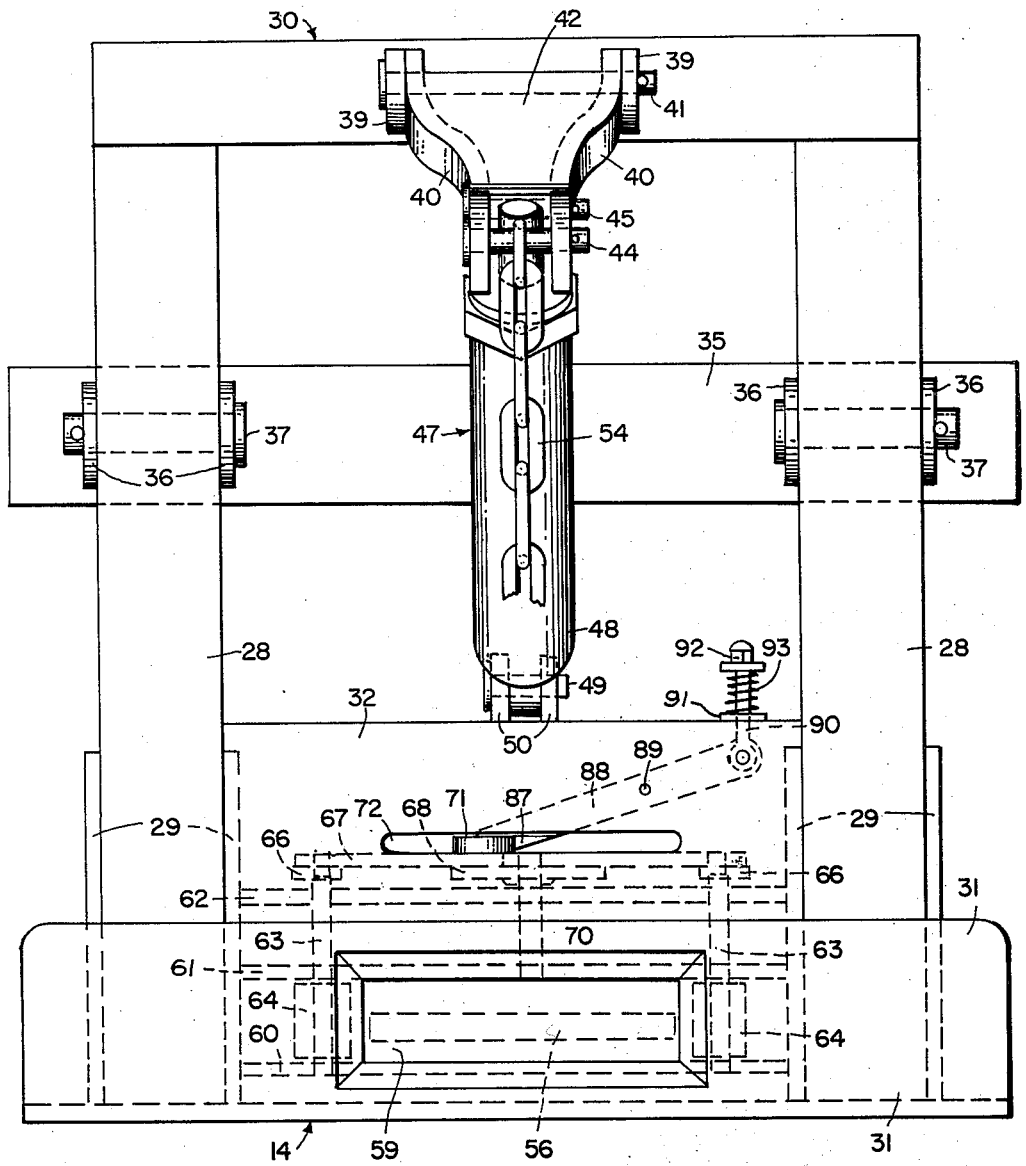
Figure 8:
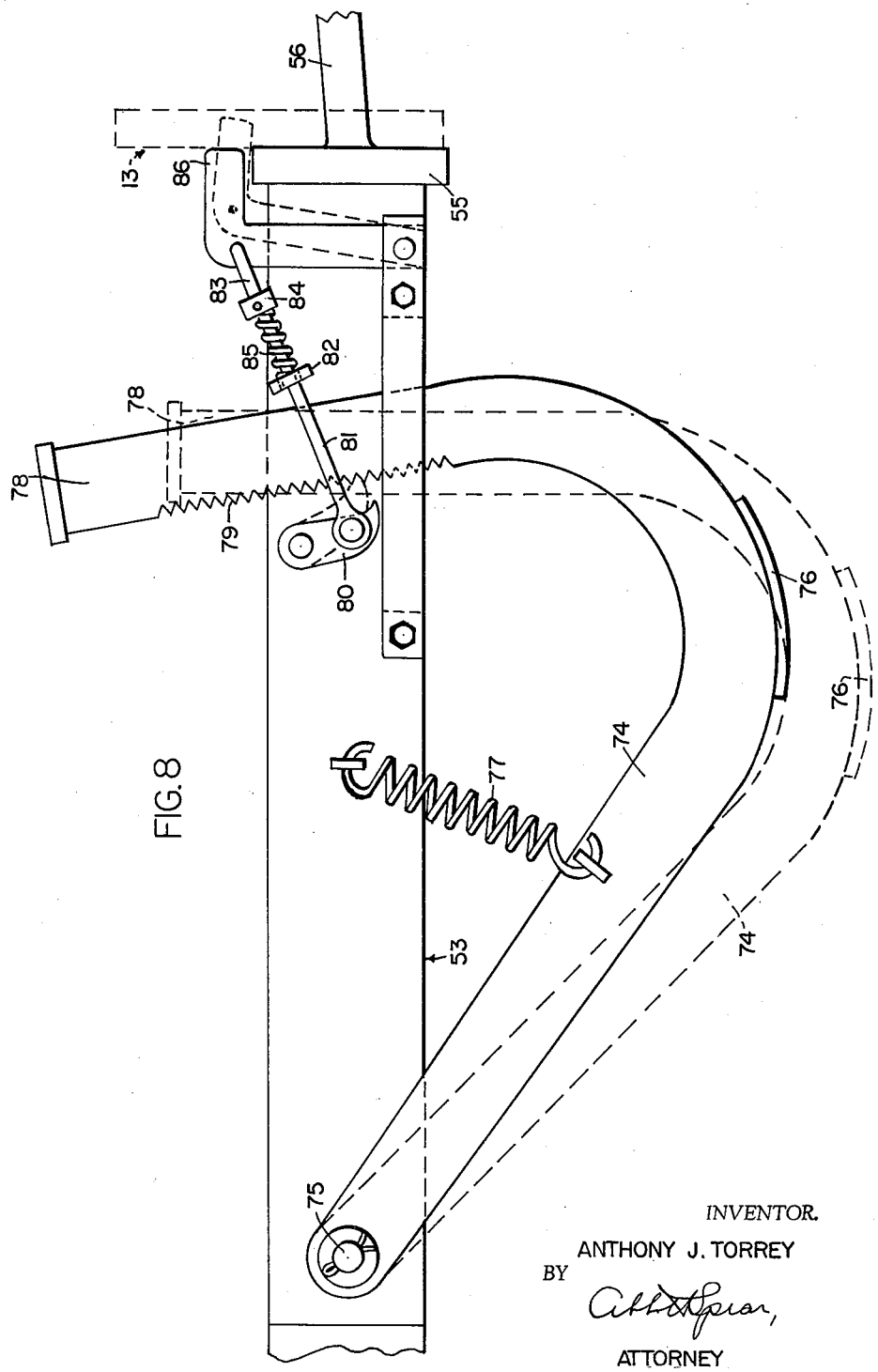

In the accompanying drawings, there is shown an illustrative embodiment of the invention from which these and other of its objectives, novel features, and advantages will be readily apparent. In the drawings, FIGURE 1 is a side elevation of a plow coupled to a vehicle showing a stand in accordance with the invention, FIGURE 2 is a partly sectioned, fragmentary top plan view of the structure shown in FIGURE 1, FIGURE 3 is a front elevational view of the coupler frame on a substantially increased scale, FIGURE 4 is a fragmentary and partly sectioned view trhough the slot for the release handle 71, also including the locking head of the blade supporting structure, which head is shown about to enter the head receiving slot of the coupler frame, FIGURE 5 is a cross sectional view showing the parts in their locking position, FIGURES 6 and 7 are sections taken approximately along the indicated lines 6—6 and 7—7, respectively of FIGURE 5, and FIGURE 8 is a section taken approximately along the indicated lines 8—8 of FIGURE 2.

Figure 1:
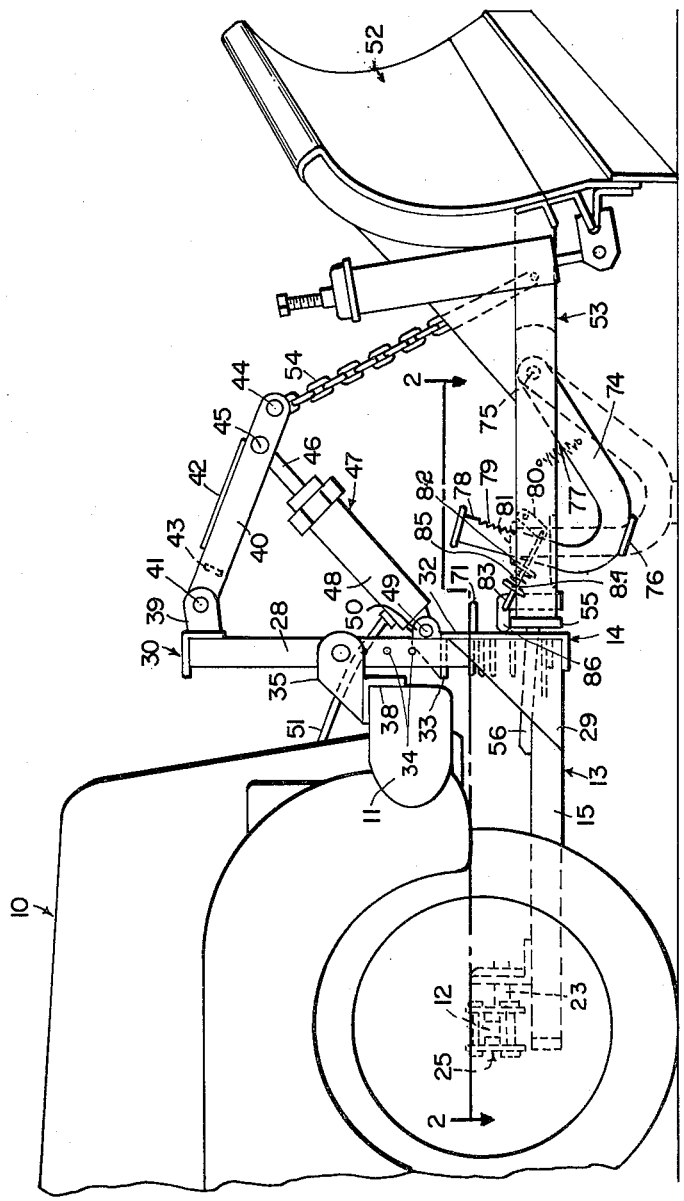

The front end portion of a truck is generally indicated at 10 in FIGURE 1 and is shown as including a bumper 11 and a front axle 12.

A coupler is shown as consisting of a generally indicated coupler frame 13 which has a transverse member generally indicated at 14 and shown as being of right angular section. Adjacent the ends of the member 14, there are rearwardly extending braces 15 welded to the wall 16 of the member 14 and these are conveniently of channel form. The braces are joined at their rear ends by a back tie plate 17.

Each of the braces 15 has a series of holes 18 with corresponding holes of the two series being transversely alined. A transverse attaching member is generally indicated at 19 and is shown as being of right angular section with its wall 20 being locked to the braces 15 by bolts 21 extending through appropriate pairs of the two series of holes 18. The other wall 22 of the member 19 has a mount 23 carrying the front plate 24 of the generally indicated clamp 25 for the front axle 12. The clamp 25 includes a rear clamping plate 26 adjustably locked to the plate 24 by bolts 27 extending both above and below the axle 12.

Uprights 28 are welded to the member 14 adjacent its ends and there are conveniently of channel form. A corner brace 29 is welded to each side of each upright 28 and to the brace 15 at the corresponding side of the coupler 13. The uprights 28 are also interconnected at their upper ends by a generally indicated top brace 30 which is conveniently of right angular section.

Welded to the uprights 28 and to the upper edge of the front wall 31 of the member 14 is a plate 32 having a rearwardly disposed flange 33. Between the top brace 30 and the flange 33, each of the uprights 28 is provided with a vertically spaced series of holes 34 with corresponding holes of the two series being transversely alined. A transverse support 35 has ears 36 through which extend anchors 37 anchoring the support 35 to the uprights 28 through transversely alined holes of the series thereof selected to position the bracket 38 for bracing engagement with the vehicle bumper 11. For such engagement, adjustment of the attaching member 19, carrying the axle clamp 25 relative to the braces 15, may be required.

The top brace 30 is provided with a pair of centrally located, forwardly disposed ears 39 through which and corresponding ends of a pair of arms 40 extends a pivot 41. The arms 40 are joined together by a tie plate 42 and a cross bar 43 and at their other ends, they carry a transverse pin 44. The arms 40 also carry a transverse pivot 45 for the exposed end of the piston rod 46 of a hydraulic jack, generally indicated at 47, and having the closed end of its cylinder 48 attached by the pivot 49 to spaced ears 50 located centrally of the flange 33 and welded thereto. The hydraulic jack 47 is connected conventionally to a source of oil under pressure as by the conduit 51.

The frame for the blade 52 is generally indicated at 53 and as it is only the means for attaching such structure to the coupler and the jack for the frame 53 with which the present invention is concerned, neither the blade nor the frame will be herein detailed other than to point out that the frame 53 is detachably connected to the pin 44 by a chain 54. In accordance with the invention, the frame 53 includes a plate 55 from which extends an upwardly and rearwardly inclined flat bar 56 provided with a flat, transversely disposed wedge shaped head 57 having forwardly and inwardly inclined shoulders 58.

The wall 31 of the transverse member 14 has a centrally located, transversely disposed slot 59 whose length is somewhat greater than the width of the bar 56 and its head 57 and whose width is several times greater than the thickness thereof, so that not only is some lateral movement possible between the coupler and the blade frame when the head 57 is within the coupler frame, but also the vertical clearances are such as the blade requires both during use and when the operator raises or lowers it by means of the hydraulic jack 47.

Horizontal plates 60, 61, and 62 are welded to the inner braces 29 and to the plate 32 in vertically spaced relationship. The plates 60 and 61 are approximately in alinement with the upper and lower edges of the slot 59. Pivots 63, one adjacent each end of the slot 59 are rotatably journalled in the plates 60, 61, and 62.

Locking jaws 64, one for each pivot 63 and having one end fast thereon, are located between the plates 60 and 61 and their thickness is approximately equal to the distance therebetween to ensure locking engagement with the shoulders 58 of the head 57 during the relative movements between the coupler 13 and the frame 53 to which reference has been made. The pivoted end of each locking jaw 64 is arcuate with respect to the axis of its pivot 63 and rotatably fits a thrust seat 65 of which there is one at each side of the slot 59. The seats 65 are arcuate with respect to the corresponding pivot axis. The other or free ends of the locking jaws 64 are similarly rounded for engagement with the shoulders 58 of the head 57.

Above the plate 62, each pivot 63 has an arm 66. Each arm 66 has a link 67 pivoted thereto and attached to the disc 68 by an eccentric pivot 69. The disc 68 is fast on the upper end of a shaft 70 journalled in the plates 61 and 62. The disc 68 has a handle 71 extending forwardly through a transverse slot 72 in the plate 32 to be readily accessible to the operator. Springs 73, one for each link 67 and connected thereto, are anchored to the plate 62 and these yieldably urge the locking jaws 64 to swing inwardy towards each other to a predetermined extent.

In use, the blade and its frame are parked to be readily accessible when needed. In order that the operator of a vehicle may drive up against the frame to enter the head 57 into the slot 59 to wedge the locking jaws apart until they are again positioned by the springs 73 in locking engagement with the shoulders 58, it is necessary that the frame 53 be itself supported in position.

For that reason, the frame 53 has a leg 74 pivotally connected thereto as at 75. The leg 74 has a shoe plate 76 and is yieldably urged upwardly into an elevated position by a spring 77. The leg 74 also has an upwardly extending end 78 having ratchet teeth 79 adapted to be caught by the pivoted latch 80 when the leg is pushed down into contact with the ground. The arm 81 is pivotably connected to the latch 80 and is slidable in a flange 82 mounted on the blade frame 53 and adjacent its end 83, the arm 81 has a collar 84 between which and the flange 82 there is a compression spring 85 yieldably urging the arm 81 rearwardly thus yieldably urging the latch 80 into latching engagement with ratchet teeth 79. The arm end 83 is pivotably connected to an L-shaped member 86, one arm of which is pivoted to the blade frame 53 and the other arm of which is rearwardly disposed. The member 86 is yieldably maintained in a position in which its rearwardly disposed arm protrudes for engagement with the front end of the coupler 13 when the head is entered in the slot 59 to be locked by the locking jaws 64 and the blade 53 is swung upwardly by means of the jack 47. One such engagement, the slide 86 is pushed forwardly to unlatch the supporting leg 74 so that it is raised by the spring 77.

When the operator wishes to disconnect the blade frame 53 from the coupler, he depresses the leg 74 into engagement with the ground and swings the locking jaws 64 apart to free the head 57. This is accomplished by means of the handle 71 and, when this is done, it is caught by the latch end 87 of a lever 88 pivoted to the plate 32. The other end of the lever 88 has a push rod 90 pivotally connected thereto which slidably passes upwardly through a bracket 91 between which and a push rod head 92 there is a spring 93 urging the end 87 into handle latching position.

From the foregoing, it will be appreciated that the invention provides an attachment stand for supporting an attachment frame which is automatically positioned inoperatively when the attachment is coupled to a vehicle.

I claim:

1. In an attachment such as a snow plow or scraper which is to be coupled to a frame carried by a vehicle and which has a thrust member, said attachment including a frame which engages the thrust member when the attachment is coupled to the vehicle, a stand attached to said attachment frame for movement upwardly and downwardly relative thereto, a spring interconnecting said stand and said attachment frame and yieldably maintaining said stand in an elevated, inoperative position, and latching means operable to lock said stand to said attachment frame in a lowered, operative position, said latching means including a release yieldably held in a position to be actuated by said thrust member when said attachment frame is in engagement therewith.

2. In an attachment such as a snow plow or scraper which is to be coupled to a frame carried by a vehicle and which has a thrust member, said attachment including a frame which engages the vehicle thrust member when the attachment is coupled to the vehicle, a stand attached to said attachment frame for movement upwardly and downwardly relative thereto, a spring interconnecting said stand and said attachment frame and yieldably maintaining said stand in an elevated, inoperative position, and latching means operable to lock said stand to said attachment frame in any one of a plurality of lowered, operative positions, said latching means including a rack surface on said stand and a latch movable into and out of engagement with said rack surface, spring means yieldably urging said latch into engagement with said rack surface, said latch positioned to be actuated by said thrust member when said attachment frame is in engagement therewith.

3. In an attachment such as a snow plow or scraper which is to be coupled to a frame carried by a vehicle and which has a thrust member, said attachment including a frame which engages the vehicle thrust member when the attachment is coupled to the vehicle, a stand attached to said attachment frame for movement upwardly and downwardly relative thereto, a spring interconnecting said stand and said attachment farme and yieldably maintaining said stand in an elevated, inoperative position, and latching means operable to lock said stand to said attachment frame in any one of a plurality of lowered, operative positions, said latching means including a rack surface on said stand, a latch pivoted to said attachment frame to swing into and out of engagement with said rack surface when operatively positioned, and a release yieldably held in a position engaging said rack surface and to be actuated by said thrust member when said attachment frame is in engagement therewith.

4. In an attachment such as a snow plow or scraper which is to be coupled to a frame carried by a vehicle and which has a thrust member, said attachment including a frame which engages the vehicle thrust member when the attachment is coupled to the vehicle, a stand pivotally attached to said attachment frame, a spring interconnecting said stand and said attachment frame and yieldably maintaining said stand in an elevated, inoperative position, and latching means operable to lock said stand to said attachment frame in a lowered, operative position, said latching means including a release yieldably held in a position to be actuated by said thrust member when said attachment frame is in engagement therewith.

5. In an attachment such as a snow plow or scraper which is to be coupled to a frame carried by a vehicle and which has a thrust member, said attachment including a frame which engages the vehicle thrust member when the attachment is coupled to the vehicle, a U-shaped stand, one end of said stand being pivotally attached to said attachment frame, a spring interconnecting said stand and said attachment frame and yieldably maintaining said stand in an elevated, inoperative position, and latching means operable to lock said stand to said attachment frame in any one of a plurality of lowered, operative positions, said latching means including a rack surface on the other end of said stand and a release carried by said attachment frame and yieldably held in a position engageable with said rack surface and to be actuated by said thrust member when said attachment frame is in engagement therewith.

References Cited in the file of this patent
UNITED STATES PATENTS

| | | |
|---|---|---|
| 2,474,483 | Luttrell | June 28, 1949 |
| 2,478,591 | Miller | Aug. 9, 1949 |